March 7, 1933.     E. ERICKSON ET AL     1,900,438
COLLAPSIBLE LUGGAGE RACK
Filed March 6, 1931     3 Sheets-Sheet 1
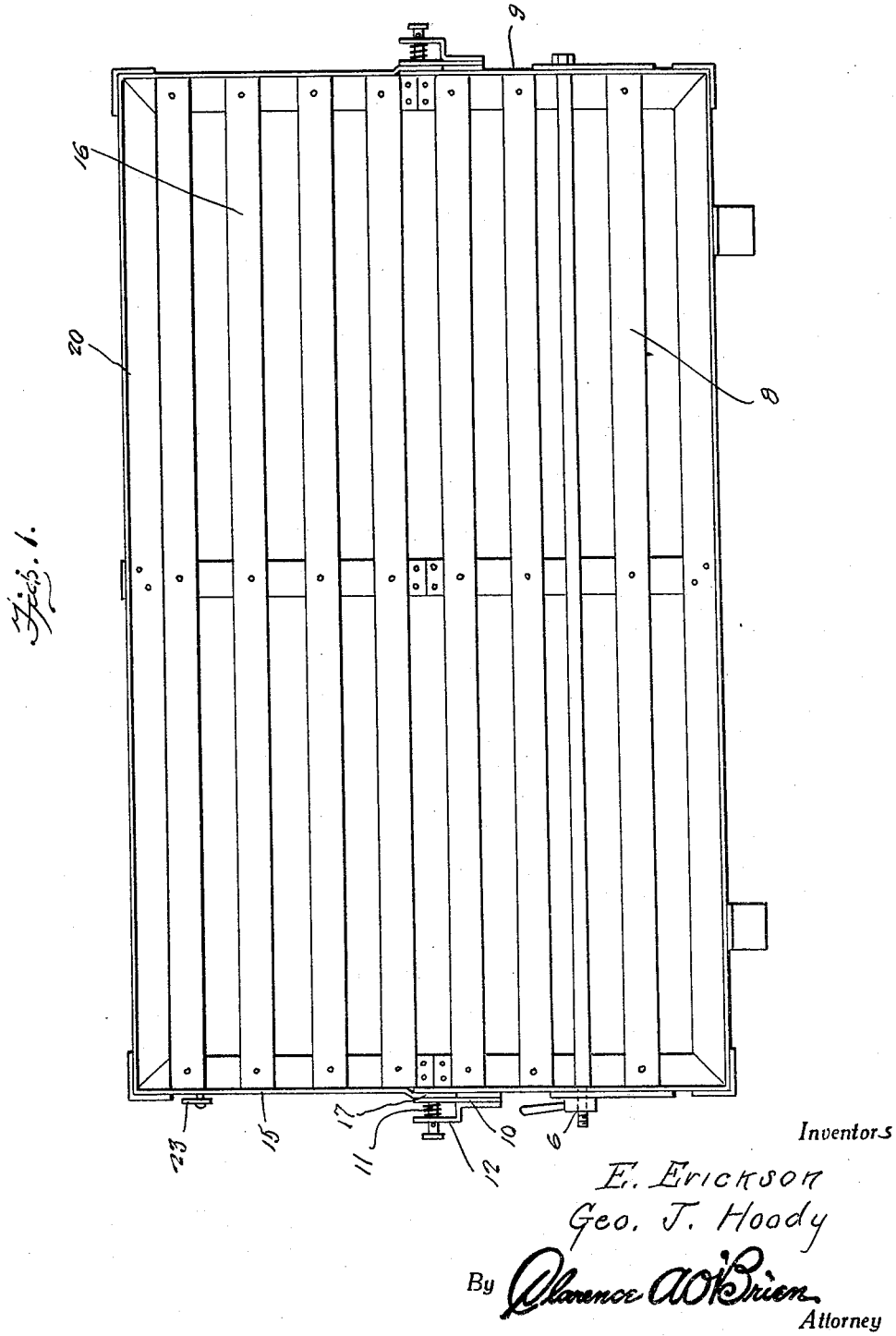
Inventors
E. Erickson
Geo. J. Hoody
By Clarence A. O'Brien
Attorney March 7, 1933.    E. ERICKSON ET AL    1,900,438
COLLAPSIBLE LUGGAGE RACK
Filed March 6, 1931    3 Sheets-Sheet 2
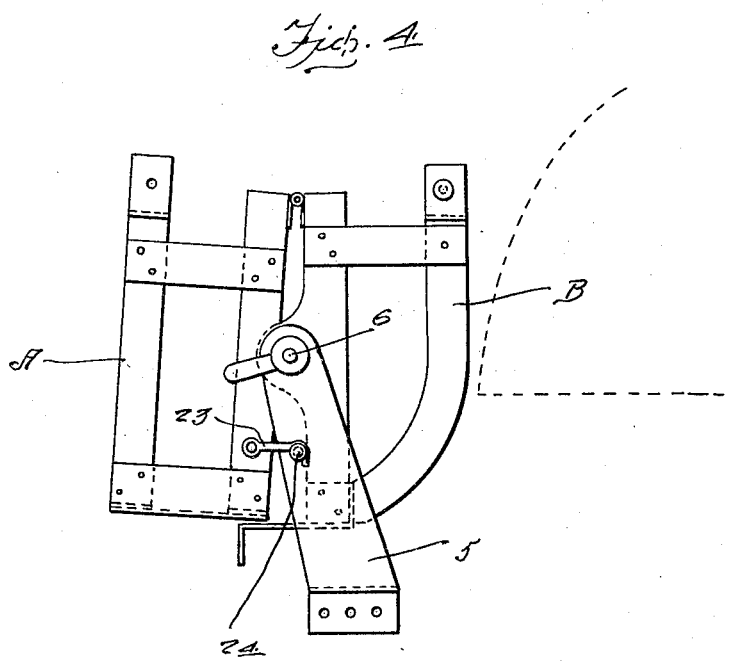
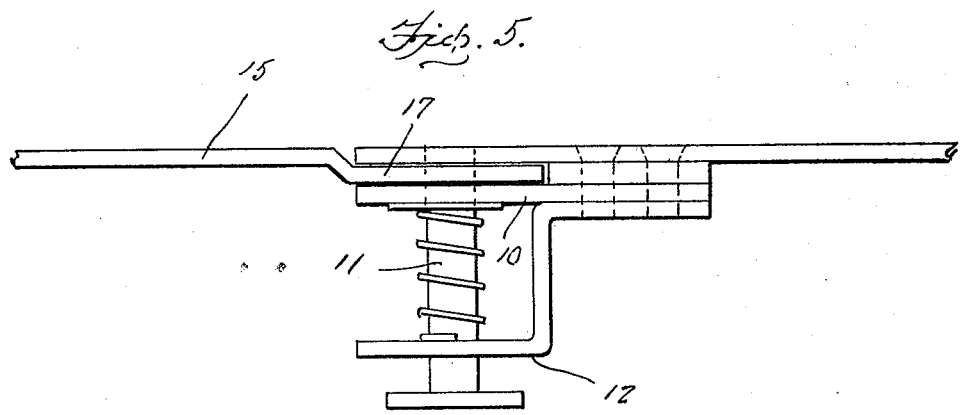
Inventors
E. Erickson
Geo. J. Hoody
By Clarence A O'Brien
Attorney March 7, 1933.  E. ERICKSON ET AL  1,900,438
COLLAPSIBLE LUGGAGE RACK
Filed March 6, 1931    3 Sheets-Sheet 3
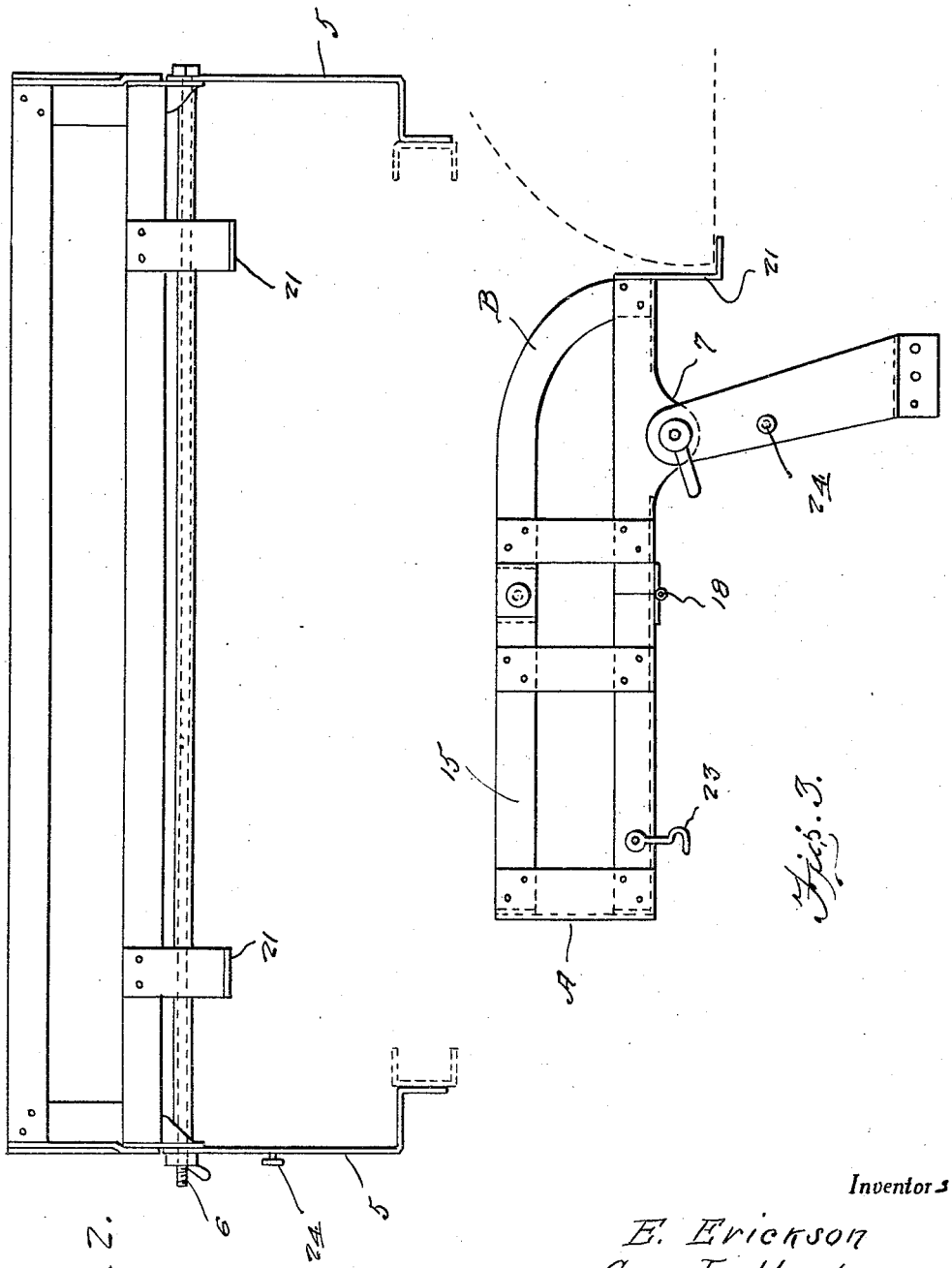
Inventors
E. Erickson
Geo. T. Hoody
By Clarence A. O'Brien
Attorney Patented Mar. 7, 1933

1,900,438

UNITED STATES PATENT OFFICE

EVERETT ERICKSON AND GEORGE J. HOODY, OF OMAHA, NEBRASKA

COLLAPSIBLE LUGGAGE RACK

Application filed March 6, 1931. Serial No. 520,692.

The present invention relates to a luggage rack designed particularly for use on the rear end of automobiles and other vehicles and has for its prime object to provide a structure which is collapsible into a relatively compact condition when not in use or which may be extended to provide a relatively large carrying space for varying purposes.

A further important object of the invention resides in the provision of a collapsible rack of this nature which is exceedingly simple in its construction, inexpensive to manufacture and install, easy to manipulate, convenient, efficient and reliable in construction and operation and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:

Figure 1 is a top plan view of the rack in extended position.

Figure 2 is an end elevation thereof.

Figure 3 is a side elevation thereof.

Figure 4 is another side elevation thereof showing the same in collapsed condition, and Figure 5 is a detail view of a fastening means.

Referring to the drawings in detail, it will be seen that the numerals 5 denote a pair of brackets which may be fixed to the rear portions of a frame of an automobile or the like to rise therefrom and preferably incline slightly rearwardly and upwardly. A rod 6 is disposed across the upper ends of these brackets 5. The rack is formed in two sections A and B. The section B is rockable on the rod 6 by having portions of its bottom extended to form ears 7 rockable on the rods.

This section B includes a bottom 8 and sides 9. One of the rails of each side 9 has a plate 10 fixed thereto in spaced parallel coextensive relationship to receive a spring pressed pin 11 in openings thereof, the pin 11 being slidable in a bracket 12.

The upper rails of the sides 15 which rise from bottom 16 of section A terminates in offset extensions 17 receivable between the rails of the sections B and the plates 10 and apertures to receive the pins 11 so as to hold the two sections in their extended relationship with respect to each other. The sections have their adjacent bottom portions hinged together as at 18. The section A is formed with a rear rail structure 20. The section B at its front end is provided with depending L-shaped members 21 to engage the body of the automobile when the rack is in extended position thereby holding it horizontal or relatively so.

When the sections are in collapsed position as is indicated in Figure 4 a hook 23 on one section is engageable with a lug 24 on one of the brackets 5 to hold the parts in this collapsed position.

It is thought that this construction, manipulation, utility and advantages of this invention will now be quite apparent to those skilled in this art without a more detail description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described our invention, what we claim as new is:

1. A collapsible luggage rack for motor vehicles and the like including brackets fixed to the vehicle; a pair of hingedly connected rack sections adapted to be folded one upon the other, one of said sections being pivoted intermediate its front and rear edges to said brackets to swing from a substantially horizontal position to a substantially vertical folded position between said brackets; stop members fixed to the rear edge of said one section to engage the body of the vehicle when the said one section is swung from the said vertical folded position to a substantially horizontal position; spring pressed pins slidably mounted on the said one section at relatively opposite sides thereof, extensions on corresponding sides of the other of said rack sections and having apertures to receive said pins to thereby retain the sections substantially horizontal and in extended alinement; and inter-engaging means on said other rack section and on one of said brackets to retain the sections in substantially vertical folded positions.

2. A collapsible luggage rack for motor vehicles and the like including a pair of hingedly connected rack sections adapted to be folded one on the other, means including fixed brackets pivotally supporting one of said rack sections on the vehicle to swing relative thereto, inter-engaging means on said sections above the hinge connection between said sections for securing said sections in extended alinement, a laterally projecting pin on one of said brackets and a pivoted hook carried by the other of said rack sections and engageable with said pin for retaining said sections in substantially vertical folded position.

3. A collapsible luggage rack including a pair of hingedly connected sections each of which includes a bottom and sides rising from said bottom, an apertured plate fixedly secured to each of the sides of one rack section in spaced parallelism to said sides, a bracket fixedly mounted adjacent each plate, a spring pressed pin slidably mounted on each bracket and adapted to engage the aperture in a proximate plate, and extensions on the sides of the other of the rack sections adapted to engage said pins for retaining said sections in extended alinement.

In testimony whereof we affix our signatures.

EVERETT ERICKSON.
GEORGE J. HOODY.